(12) United States Patent
Abdullah et al.

(10) Patent No.: US 9,597,818 B2
(45) Date of Patent: Mar. 21, 2017

(54) GEOPOLYMER BRICK FABRICATION SYSTEM

(71) Applicant: KING ABDUL AZIZ CITY SCIENCE & TECHNOLOGY (KACST), Riyadh (SA)

(72) Inventors: Mohd Mustafa Al Bakri Abdullah, Kangar (MY); Muhammad Faheem Mohd Tahir, Kangar (MY); Kamarudin Hussin, Kangar (MY); Mohammad Tamizi Selimin, Kangar (MY); Wan Mastura Wan Ibrahim, Kangar (MY); Muhd Izzat Ahmad, Kangar (MY); Che Mohd Ruzaidi Ghazali, Kangar (MY); Khairul Nizar Ismail, Kangar (MY); Mohammed Binhussain, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 278 days.

(21) Appl. No.: 14/450,296

(22) Filed: Aug. 4, 2014

(65) Prior Publication Data
US 2016/0031117 A1    Feb. 4, 2016

(51) Int. Cl.
*B28B 13/00* (2006.01)
*B28B 15/00* (2006.01)
*B28C 5/12* (2006.01)
*C04B 12/00* (2006.01)

(52) U.S. Cl.
CPC ............... *B28B 15/00* (2013.01); *B28C 5/12* (2013.01); *C04B 12/005* (2013.01)

(58) Field of Classification Search
CPC .......... B28B 15/00; B28C 5/12; C04B 12/005
USPC ............... 425/253, 260, 351, 413, 421, 422
See application file for complete search history.

(56) References Cited

U.S. PATENT DOCUMENTS

| | | | | |
|---|---|---|---|---|
| 3,499,069 A | * | 3/1970 | Seigle | B28B 3/02 264/234 |
| 4,559,004 A | * | 12/1985 | Augier | B28B 3/027 425/150 |
| 7,615,178 B2 | * | 11/2009 | Porter | B32B 5/02 264/136 |

* cited by examiner

*Primary Examiner* — Joseph S Del Sole
*Assistant Examiner* — Thukhanh T Nguyen
(74) *Attorney, Agent, or Firm* — Timberline Patent Law Group PLLC

(57) ABSTRACT

A geopolymer brick fabrication system comprising a mixer (100) having a tank (101) which comprises a closeable bottom outlet (102) and an inner surface coated with saturated polyester resin that is resistant against corrosive geopolymeric material for receiving the geopolymer raw material to be mixed by shaft (103) driven by a spindle motor (104) a molding section (200) to receive the mixed geopolymer raw material through a slanted conveyer (105) upon opening of the closeable outlet (102) for shaping the mixture under pressure inside a mold (201) to obtain a geopolymer brick and a curing section (300) having a moving platform (301) across a curing chamber (302) to simultaneously cure and transport the brick thereon.

7 Claims, 1 Drawing Sheet

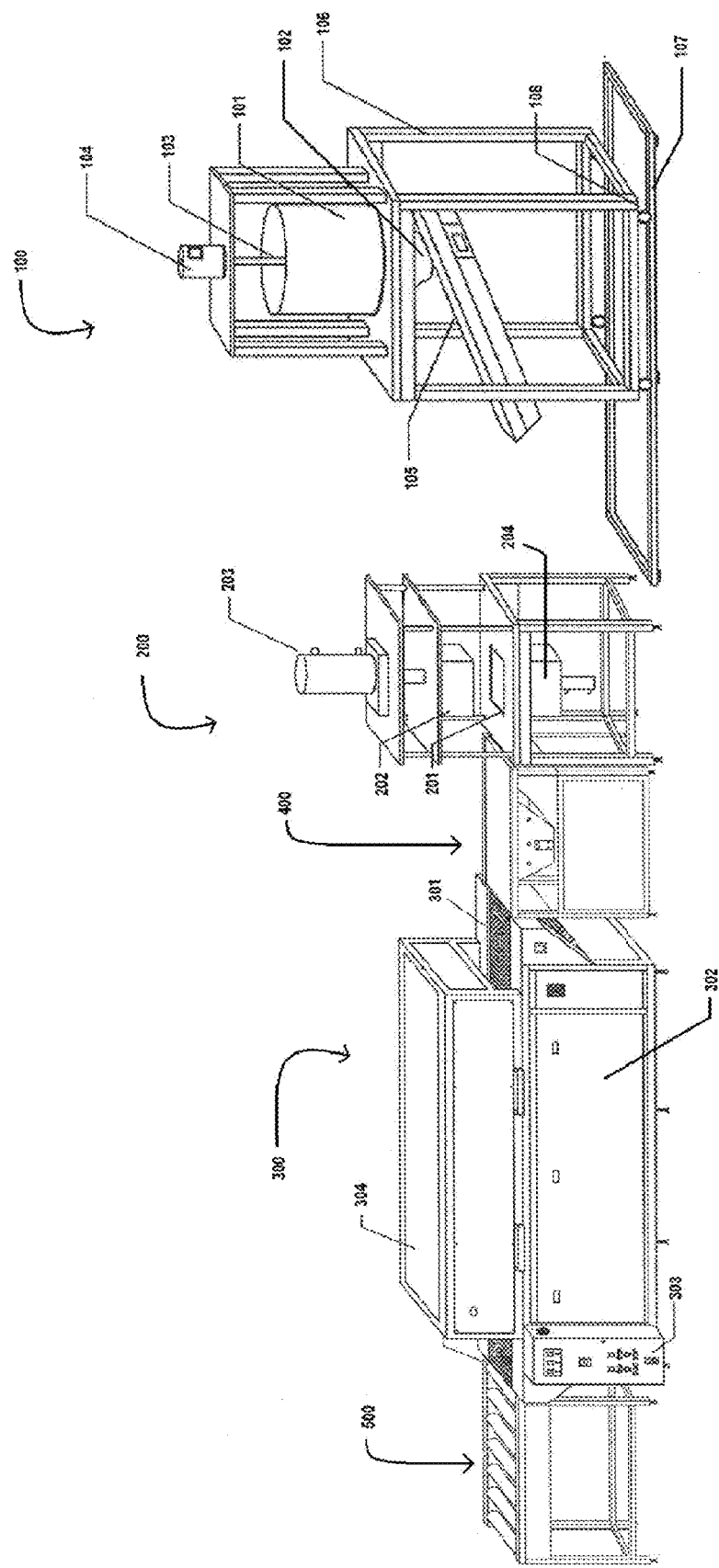

GEOPOLYMER BRICK FABRICATION SYSTEM

FIELD OF INVENTION

This present invention relates to a system to fabricate geopolymer brick. In particular, the system comprises a mixer having a tank coated with saturated polyester resin, a moulding section and a curing section which are interconnected with conveyers to deliver or receive the products therefrom.

BACKGROUND OF THE INVENTION

Bricks are blocks or a single unit of a ceramic material used in masonry construction. It is essentially made from clay, lime-and-sand, concrete or shaped stone. Common methods in producing a brick comprises mixing the raw ingredients with water, pressing and fired to achieve strength. To obtain a consistent brick product, the bricks are often fired in tunnel kiln having conveyers, rails or kiln cars. Often, the composition of raw ingredients are adjusted to accelerate the burning process.

A China Patent No. CN101941825A has disclosed a manufacturing method of an environmental friendly brick from combustion slag of oil-bearing sludge. The method of manufacturing comprises mixing, extrusion molding in a mechanical vibration mode, steam-curing and cooling the produced brick naturally.

Another China Patent No. CN101913842A reveals a manufacturing method of a baked light-weight environmental friendly bricks prepared from paper mill sludge. The method comprises mixing the materials with water, extruding the damp product, molding with a blank cutter, pressing and naturally drying the for 7 days. Finally, the air-dried bricks are baked in a tunnel kiln for a finished product.

Nevertheless, the bricks in the prior arts above mainly comprises water, or a treatment using steam. This is due to the usage of cement which requires a hydration step to impart binding properties with other raw materials of a brick. Consequently, the brick is able to harden and solidify upon demoulding.

Geopolymer has been widely used as an alternative source of cement in brick making industry. Geopolymer bricks are essentially made from aluminosilicate material. In a highly alkaline environment, silicon hydroxides and aluminium hydroxides are released from the material. Subsequently, polycondensation reaction leads to solidification, whereby an aluminosilicate tetrahedral polymer network is formed. Recently, pozzolan or pozzolanic material has been gaining popularity to act as aluminosilicate material in an alkaline medium. Beside the choice of geopolymer material to be used, the ratio of each material, the homogeneity in the material mixture, the hardening or curing condition could also affect the integrity of the produced geopolymer brick.

A United States Patent No. US2012255462 A1 discloses a production of geopolymers from oil shale, mineral residues or a combination thereof. However, the prior art merely discloses the method of producing such geopolymer which comprises pretreatment of the oil shale, mixing, hardening and demoulding the geopolymer. The mixture is presented and also transported between stages in its slurry form until it reaches the hardening stage. Hence, more than a mould is necessary to hold the slurry before it is hardened. Further, a demoulding stage is required to retrieve the mould.

Nevertheless, most patented technologies emphasize on the composition and choice of geopolymer material in preparation of geopolymer. Hence, a system for batch production of geopolymer brick is desired to withstand high alkaline environment of geopolymer material.

SUMMARY OF THE INVENTION

The object of the present invention is to provide a system for batch production of geopolymer brick. In one of the preferred embodiment, the system is able to process 40 to 200 kg of geopolymer raw material in a batch.

The object of the invention is to provide a system having a motor-driven mixer to produce homogeneous geopolymer raw material mixture.

One of the object of the invention is to provide a system comprising a mixer having a tank coated with saturated polyester resin to be resistant against high alkaline condition provided by the geopolymer raw material.

One of the object of the invention is to provide a system which is able to produce quality geopolymer bricks. In the preferred embodiment, the bricks are cured on a moving platform across a curing chamber. Hence, heat applied in the curing section is essentially distributed along the brick to impart strength therein.

Another object of the invention is to provide a system having a controller to regulate operation of the system. Parameters such as speed of conveyer, curing temperature, rotational speed of the mixer can be adjusted via the controller.

At least one of the preceding objects is met, in whole or in part, by the present invention, in which the embodiment of the present invention describes a geopolymer brick fabrication system comprising a mixer (100) having a tank (101) which comprises a closeable bottom outlet (102) and an inner surface coated with saturated polyester resin that is resistant against corrosive geopolymeric material for receiving the geopolymer raw material to be mixed by shaft (103) driven by a spindle motor (104), a moulding section (200) to receive the mixed geopolymer raw material through a slanted conveyer (105) upon opening of the closeable outlet (102) for shaping the mixture under pressure inside a mould (201) to obtain a geopolymer brick and a curing section (300) having a moving platform (301) across a curing chamber (302) to simultaneously cure and transport the brick thereon.

One skilled in the art will readily appreciate that the present invention is well adapted to carry out the objects and obtain the ends and advantages mentioned, as well as those inherent therein. The embodiments described herein are not intended as limitations on the scope of the invention as well as not limited to what are described herein.

BRIEF DESCRIPTION OF THE DRAWING

FIG. 1 An illustration of the geopolymer brick fabrication system

DETAILED DESCRIPTION OF THE INVENTION

This present invention relates to a system to fabricate geopolymer brick. Raw material of geopolymer is essentially measured according to ratio in order to customize the brick for a desired purpose.

The geopolymer raw material can be a combination of pozzolanic material, alkaline activator and aggregate. The pozzolanic material can be any siliceous or siliceous and aluminous material which is able to react chemically in alkaline condition to obtain compounds having cementitious properties. Therefore, the pozzolanic material is essentially substituting the use of cement in bricks.

The pozzolanic material used can be of both natural and artificial material, nevertheless the natural material is favoured to conserve energy and prevent formation of industrial waste. In order to conserve natural resources, the material is preferably obtain from industrial, agricultural, domestic or sewage waste. In the preferred embodiment of this invention, the pozzolanic material can be derived from fly ash, volcanic ash, palm oil fly ash or a combination thereof.

To provide alkaline condition for chemical reaction or geopolymerization to occur, alkaline activator can be employed. Preferably, the alkaline activator is sodium hydroxide, sodium silicate or a combination thereof. Nevertheless, calcium hydroxide, potassium hydroxide can also be used in lieu of sodium hydroxide.

Aggregates are essentially used as part of the geopolymer raw material. Preferably, the aggregate is sand, gravel, crushed stone, slag or a combination thereof.

In one of the preferred embodiment, a batch of geopolymer brick composition has pozzolanic material to alkaline activator, sodium silicate to sodium hydroxide in alkaline activator and aggregate to pozzolanic materials in a weight ratio of 0.5 to 4:0.5 to 4:2 to 8. The geopolymer brick produced according to the ratio mentioned can be used to substitute cement brick in construction industries as a construction material.

Hereinafter, the geopolymer brick fabrication system is shown in FIG. 1. Preferably, a batch of geopolymer raw material can be measured and be fed into the mixer (100) of the system.

The present invention discloses a geopolymer brick fabrication system comprising a mixer (100) having a tank (101) which comprises a closeable bottom outlet (102) and an inner surface coated with saturated polyester resin that is resistant against corrosive geopolymeric material for receiving the geopolymer raw material to be mixed by shaft (103) driven by a spindle motor (104), a moulding section (200) to receive the mixed geopolymer raw material through a slanted conveyer (105) upon opening of the closeable outlet (102) for shaping the mixture under pressure inside a mould (201) to obtain a geopolymer brick and a curing section (300) having a moving platform (301) across a curing chamber (302) to simultaneously cure and transport the brick thereon.

Prior to usage, the inner surface of the tank (101) is preferably coated by saturated polyester resin to sustain a high alkaline condition provided by the mixture. The resin can be applied to the surface by powder coating or electrostatic spraying. Nevertheless, powder coating is favoured to avoid the use of solvent which is basically required for liquid coating such as a paint or lacquer. Further, the resin used is preferably chemical resistance and salt spray resistance. The coating applied substantially protects the tank from corrosion. In the preferred embodiment, the tank is having a mixing capacity in a range from 40 to 200 kg for a batch of geopolymer raw material.

Further, surface of the shaft (103) is preferably coated with the saturated polyester resin prior to usage.

Hereinafter, the geopolymer raw material is fed to the mixer (100) essentially driven by a spindle motor (104) having at least one shaft. Preferably, a shaft (103) having helical gear is employed to facilitate the mixing process. In particular, the shaft can be operated from 2 to 10 Hp under 10 revolution per minute (rpm) of rotational speed.

Further, the mixer further comprises a moveable frame structure (106) which basically imparts mobility to a frame carrying the mixer (101) and the slanted conveyer (102). The moveable frame structure (106) essentially comprises rollers attached at the base. When a force is applied horizontally, the structure (106) is able to slide away from the direction of the applied force. In the preferred embodiment, the moveable frame structure (106) is mounted on a sliding track.

An essentially homogeneous mixture is obtained from the mixer (100). The mixture can be released upon opening of the closeable bottom outlet (102) to reach the slanted conveyer (105). Subsequently, the slanted conveyer (105) can be brought into contact with the moulding section (200) via sliding of the movable frame structure (106).

The amount of the mixture being delivered to the moulding section (200) can be determined by controlling opening time of the closeable outlet (102), speed of the slanted conveyer (105) and contacting time between the mixture (100) and the moulding section (200). Preferably, the system in the present invention is having a controller (303) to regulate the operation mentioned.

The moulding section (200) essentially comprises a compressor (203) to apply pressure for pressing. The compressor can be an air compressor or a hydraulic compressor. A top mould (202) is attached beneath the compressor to transfer the pressure applied therein to the mould (201) where geopolymer raw material is preferably placed.

The compressor (203) is preferably having a force capacity of 40 tonne, or 40,000 kg. The geopolymer raw material mixture is essentially compressed inside the mould (202) to obtain a brick shape.

In the preferred embodiment, the moulding section (200) is having an ejector (204) beneath the mould (201) to release the brick therefrom. Basically, the ejector can be driven by electric or hydraulic power to provide an upward vertical force against the gravity. The force can be used to detach the brick from the mould, hence releasing an uncured shaped geopolymer brick.

The system in the present invention further comprising an extension conveyer (400) between the moulding section (200) and the curing section (300). The uncured shaped geopolymer brick can be delivered to the curing section via translational force which is derived from movement of the frame structure (106).

In the preferred embodiment, the moving frame structure (106) essentially brings the slanting conveyer into contact with the brick formed on the mould base (201) prior to release of another portion of the geopolymer mixture. Upon contact, the translational force is transferred onto the brick hence delivering the brick into the extension conveyer (400).

The extension conveyer (400) essentially offers a moving platform for the brick to reach the curing chamber (300).

Preferably, the curing section (300) comprises a moving platform (301) and a curing chamber (302) which is essentially a heater. Preferably, an infrared heater is used. Nevertheless, an oven can also be utilised.

An insulated hood (304) having fibre wool can be mounted on the moving platform (301) to minimize dissipation of heat to the environment. The moving platform (301) can be a conveyer system having stainless steel conveyer belt to withstand high temperature during curing process.

Hence, the brick enters the curing section (300) and being cured on the moving platform (301). The brick is being simultaneously cured and transported along the moving platform (301) for a certain period depending on the speed of the moving platform (301). The heater in the curing chamber (302) used is able to provide a temperature range of 50 to 500° C.

Hereinafter, the system further comprising a controller (303) attaching to the curing chamber (302) to regulate operation of the system. The controller (303) can be used to control operations such as temperature, speed of conveyer, leveling of compressor, opening or closure of outlet and movement of the moveable frame structure. Further, it provides a function that terminates all operation therein.

The system further comprising a gravity roller conveyer (501) connected to receive geopolymer bricks from the curing section (300). The bricks obtained can be simultaneously cooled and transported on the gravity roller conveyer (501) that leads to a collection point for the geopolymer bricks.

The invention claimed is:

1. A geopolymer brick fabrication system comprising:
   a mixer (100) having a tank (101) on a frame structure (106), the tank (101) including a closeable bottom outlet (102) and an inner surface coated with a saturated polyester resin that is resistant against a corrosive geopolymeric material, the inner surface for receiving a geopolymer raw material to be mixed by a shaft (103) driven by a spindle motor (104);
   a moulding section (200) to receive a first portion of the mixed geopolymer raw material from the tank (101) through a slanted conveyer (105) upon opening of the closeable outlet (102) for shaping the mixture under pressure inside a mould (201) to obtain a geopolymer brick;
   a curing section (300) having a moving platform (301) across a curing chamber (302) to simultaneously cure and transport the geopolymer brick thereon; and
   wherein the frame structure (106) and the slanted conveyor (105) move into contact with the geopolymer brick formed at the moulding section (200) prior to release of a second portion of the geopolymer raw material mixture from the slanted conveyor (105), the slanted conveyor (105) pushing an instance of the geopolymer brick into the curing section (300) prior to releasing the second portion of the geopolymer raw material into the mould (201) of the moulding section (200).

2. A system according to claim 1, wherein the tank (101) has a mixing capacity in a range from 40-200 kg of the geopolymer raw material.

3. A system according to claim 1, wherein the moulding section (200) has an ejector (204) beneath the mould (201) to release the geopolymer brick therefrom.

4. A system according to claim 1 further comprising an extension conveyer (400) between the moulding section (200) and the curing section (300).

5. A system according to claim 1 further comprising a controller (303) to regulate operation of the system and movement of the frame structure (106) and the slanted conveyor (105).

6. A system according to claim 1, wherein the geopolymer raw material comprises a combination of pozzolanic material, alkaline activator and aggregate.

7. A system according to claim 6, wherein the pozzolanic material is derived from fly ash, volcanic ash, palm oil fly ash or a combination thereof.

\* \* \* \* \*